US007822669B2

(12) United States Patent
Tyagi et al.

(10) Patent No.: US 7,822,669 B2
(45) Date of Patent: Oct. 26, 2010

(54) SYSTEM AND SOFTWARE FOR PROVIDING RECOMMENDATIONS TO OPTIMIZE A PORTFOLIO OF ITEMS

(75) Inventors: Rajesh Tyagi, Niskayuna, NY (US); Kete Chalermkraivuth, Niskayuna, NY (US); Marc Anthony Garbiras, Clifton Park, NY (US); John Andrew Ellis, Niskayuna, NY (US); Matthew Allen, Allen, TX (US); James G. Russo, Milford, CT (US)

(73) Assignee: General Electric Capital Corporation, Stamford, CT (US)

( * ) Notice: Subject to any disclaimer, the term of this patent is extended or adjusted under 35 U.S.C. 154(b) by 433 days.

(21) Appl. No.: 11/691,618

(22) Filed: Mar. 27, 2007

(65) Prior Publication Data

US 2008/0120251 A1    May 22, 2008

Related U.S. Application Data

(60) Provisional application No. 60/859,446, filed on Nov. 16, 2006.

(51) Int. Cl.
*G06Q 40/00* (2006.01)

(52) U.S. Cl. .................................................. 705/36 R

(58) Field of Classification Search .................... 705/35, 705/36 R, 37, 38
See application file for complete search history.

(56) References Cited

U.S. PATENT DOCUMENTS

| | | | | |
|---|---|---|---|---|
| 5,806,047 A * | 9/1998 | Hackel et al. | ............. | 705/36 R |
| 5,930,762 A * | 7/1999 | Masch | ............................ | 705/7 |
| 6,003,018 A | 12/1999 | Michaud et al. | | |
| 6,173,276 B1 | 1/2001 | Kant et al. | | |
| 6,405,179 B1 * | 6/2002 | Rebane | ..................... | 705/36 R |
| 7,305,328 B1 | 12/2007 | Fleming et al. | | |
| 7,502,756 B2 * | 3/2009 | Pillai | ........................ | 705/36 R |
| 2002/0002521 A1 * | 1/2002 | Shearer et al. | ................. | 705/36 |
| 2002/0091605 A1 * | 7/2002 | Labe et al. | ..................... | 705/36 |
| 2003/0208429 A1 * | 11/2003 | Bennett | ....................... | 705/36 |
| 2004/0186814 A1 | 9/2004 | Chalermkraivuth et al. | | |
| 2004/0199448 A1 | 10/2004 | Chalermkraivuth et al. | | |
| 2005/0010516 A1 | 1/2005 | Ivanov et al. | | |
| 2005/0080701 A1 | 4/2005 | Tunney et al. | | |
| 2006/0089895 A1 * | 4/2006 | Joye et al. | ...................... | 705/35 |
| 2006/0117303 A1 * | 6/2006 | Gizinski | ..................... | 717/136 |
| 2006/0200400 A1 * | 9/2006 | Hunter et al. | ............. | 705/36 R |
| 2007/0288397 A1 * | 12/2007 | Frahm et al. | .............. | 705/36 R |

(Continued)

*Primary Examiner*—Thu-Thao Havan
*Assistant Examiner*—Greg Pollock
(74) *Attorney, Agent, or Firm*—Buckley, Maschoff & Talwalker LLC (57) ABSTRACT

A method of operating a computer system includes storing, in the computer system, a database containing performance measure data regarding performance measures of a plurality of items. The method further includes inputting into the computer system a plurality of performance measure constraints. The method also includes modeling the performance measure constraints with a set of equations. The equations include a plurality of variables. Each of the variables corresponds to a respective one of the items. Each variable is, for example, to be assigned either the value "1" or the value "0". The value "1" may represent a recommendation to take an action relative to the corresponding item in the portfolio and the value "0" may represent a recommendation to take another action. The computer system is used to solve the set of equations to generate one or more solutions that satisfy the performance measure constraints.

6 Claims, 9 Drawing Sheets

U.S. PATENT DOCUMENTS

2008/0097768 A1 4/2008 Godshalk
2008/0120251 A1 5/2008 Tyagi et al.
2008/0163085 A1 7/2008 Subbu et al.

* cited by examiner

| Scenario | 702 | | | | | | | | Change in Embedded | | Ne |
|---|---|---|---|---|---|---|---|---|---|---|---|
| Decision | Group ID | ID | Property Name | | P&L | Net Income | EGUYOY | Value | EGUBP | Inv |
| Hold | 71498001 | 71290028 | Property 001 | | Japan | 223,311 | 107,278 | -22,163 | -230,585 | |
| Hold | 76035001 | 75059035 | Property 002 | | Japan | 247,076 | 124,729 | 40,033 | 2,706 | |
| Hold | 76008001 | 71254001 | Property 003 | | Japan | 615,402 | 238,091 | 22,396 | -204,485 | |
| Hold | 76010001 | 71290066 | Property 004 | | Japan | 206,973 | 95,109 | -20,440 | -150,426 | |
| Hold | 76034001 | 71334001 | Property 005 | | Japan | -13,859 | ####### | 21,322 | -154,501 | |
| Hold | 76046001 | 71428001 | Property 006 | | Japan | 163,100 | -806,597 | -250,923 | 42,678 | |
| Sell | 76113001 | 71290026 | Property 007 | | Japan | -44,332 | ####### | 68,203 | 197,552 | |
| Hold | 76114001 | 71290090 | Property 008 | | Japan | -51,644 | 93,227 | 21,800 | 20,178 | |
| Sell | 76115001 | 71490001 | Property 009 | | Japan | 472,509 | 108,485 | 14,659 | -245,853 | |
| Hold | 76116001 | 74483001 | Property 010 | | Japan | -874 | -6,673 | -46,414 | 16,715 | |
| Hold | 76117001 | 74929001 | Property 011 | | Japan | 113,047 | 67,632 | 14,788 | -77,860 | |
| Hold | 76118001 | 71290047 | Property 012 | | Japan | 199,292 | 1,413 | -150,116 | -194,510 | |
| Sell | 76119001 | 71500001 | Property 013 | | Japan | 764,071 | 185,273 | 6,232 | -137,946 | |
| Hold | 76120001 | 71440001 | Property 014 | | Japan | -68,680 | -121,985 | -181,170 | -85,186 | |
| Sell | 76121001 | 71290014 | Property 015 | | Japan | 351,595 | 204,043 | 104,287 | -129,735 | |
| Hold | 76122001 | 71311001 | Property 016 | | Japan | 618,214 | 200,228 | -17,439 | 122,226 | |
| Hold | 76123001 | 71236008 | Property 017 | | Japan | 933,203 | 378,719 | 25,583 | 649,603 | |
| Hold | 76118001 | 75091001 | Property 018 | | Japan | 218,132 | 59,987 | -20,656 | -143,288 | |
| Hold | 76119001 | 71290097 | Property 019 | | Japan | 51,930 | 5,094 | -15,038 | -39,166 | |
| Hold | 76120001 | 71513001 | Property 020 | | Japan | 265,963 | 20,308 | -126,091 | 273,502 | |

704

706

708

Main / Net Income breakdown / Net Book Investment Breakdown / Scenarios / Property Decisions / Hold Decisions / Sell Decisions / Rollup Summary /

SYSTEM AND SOFTWARE FOR PROVIDING RECOMMENDATIONS TO OPTIMIZE A PORTFOLIO OF ITEMS

CROSS-REFERENCE TO RELATED APPLICATION

This application claims the benefit of provisional patent application Ser. No. 60/859,446, filed Nov. 16, 2006, and incorporated herein by reference.

FIELD

The present invention relates to computer systems and more particularly to computer systems that aid in making decisions using optimization techniques relating to portfolios such as real estate portfolios.

BACKGROUND

Management of a large portfolio of real estate properties can present significant challenges, particularly when the number of properties is in the hundreds or thousands. For example, the managers of the portfolio may have objectives that are at least potentially in conflict with each other. To illustrate this with an example, an objective of increasing the amount of gains generated from selling properties may conflict with an objective of maintaining the amount of rental income produced from the portfolio. This conflict in objectives may arise with respect to a given property in that selling the property may provide the advantage of generating a gain, but may have the disadvantage of depriving the portfolio of rental income produced by the property. Moreover, real properties and/or the portfolio as a whole may be financially evaluated according to a number of different measurements, and improving the health of the portfolio with respect to some measurements may cause declines in other measurements of the portfolio's financial health.

The foregoing issues can be generalized as being applicable to other types of portfolios of assets. In general, like real properties, many types of assets or other items may be measured in terms of numerical performance measures, and actions taken with respect to the assets/items in a portfolio may have consequences that enhance some measured aspects of a portfolio while causing other measured aspects to decline. When the number of assets/items in a portfolio (or potentially available for inclusion in a portfolio) is large, there may be great difficulties in determining how best to make trade-offs inherent in conflicting sets of objectives.

SUMMARY

To provide alternatives to, or alleviate problems inherent in, the prior art, the present invention introduces improved systems and methods and computer programs for making recommendations as to what actions to take with respect to a portfolio of items in order to optimize one or more aspects of the portfolio.

According to one embodiment, there is provided a method of operating a computer system. The method includes storing, in the computer system, a database that contains performance measure data regarding performance measures of a plurality of items. The method further includes inputting into the computer system a plurality of performance measure constraints. In addition, the method includes modeling the performance measure constraints with a set of equations. The equations include a plurality of variables. Each of the variables corresponds to a respective one of the items in the portfolio. Each of the variables is to be assigned a value from a group of values. The group of values includes at least two values. One of the two values indicates a recommendation to take an action with respect to one of the items that corresponds to a respective one of the variables. The other of the two values indicates a recommendation to take another action with respect to the item in question. In addition, the method includes using the computer system to solve the set of equations to generate one or more solutions that satisfy the performance measure constraints. As the term "action" is used herein and in the appended claims, omitting to take an action may also be considered to be taking an action. Thus, not selling (i.e., holding or retaining) an item is to be considered an action with respect to the item, and is a different action from selling the item.

Further, in some embodiments, there may be a plurality of solutions that result from solving the set of equations. Moreover, the method may further include inputting into the computer system an optimization goal, and using the computer system to evaluate the plurality of solutions to identify the solution that is optimal relative to the optimization goal. Also, the method may include presenting the solution that was identified as optimal as a recommended decision relative to taking actions with respect to the items in the portfolio.

With these and other advantages and features of the invention that will become hereinafter apparent, the invention may be more clearly understood by reference to the following detailed description of the invention, the appended claims, and the drawings attached herein.

DETAILED DESCRIPTION

To introduce some concepts of the invention in a general way, a mathematical model is provided to represent the effects of taking certain actions with respect to a portfolio of items. The mathematical model may be formed from a set of simultaneous equations. (As used herein and in the appended claims, the term "equation" refers to inequalities—i.e., mathematical statements that include the symbols "<", ">", "≦" or "≧"—as well as to mathematical statements that include the equal sign ("=").) The variables in the equations may represent some or all of the items in the portfolio. Each variable may be assigned either a value of "1" or "0", where the value "1" represents that an action is recommended to be taken with respect to the item which corresponds to the variable, and the value "0" represents a recommendation to take a different action with respect to the item. The equations may each represent a constraint, such as constraints measured in one of the performance measures of the portfolio, that the user of the system wishes to be produced with respect to the portfolio. The user may also enter a particular portfolio performance measure that the user wishes to optimize (maximize or minimize) while keeping within the constraints that the user has prescribed.

Software employed in accordance with the invention may solve the performance measure constraint equations to generate, if possible, one or more solutions that satisfy the performance measure constraint equations. If more than one solution is produced, software provided in accordance with the invention may evaluate all of the solutions in order to identify which solution is optimal relative to the performance measure that the user selected to be optimized. The system presents the resulting optimal solution to the user as a recommended set of actions to be taken with respect to the portfolio as well as a summary of financial metrics of the recommended solution.

Figure 1:
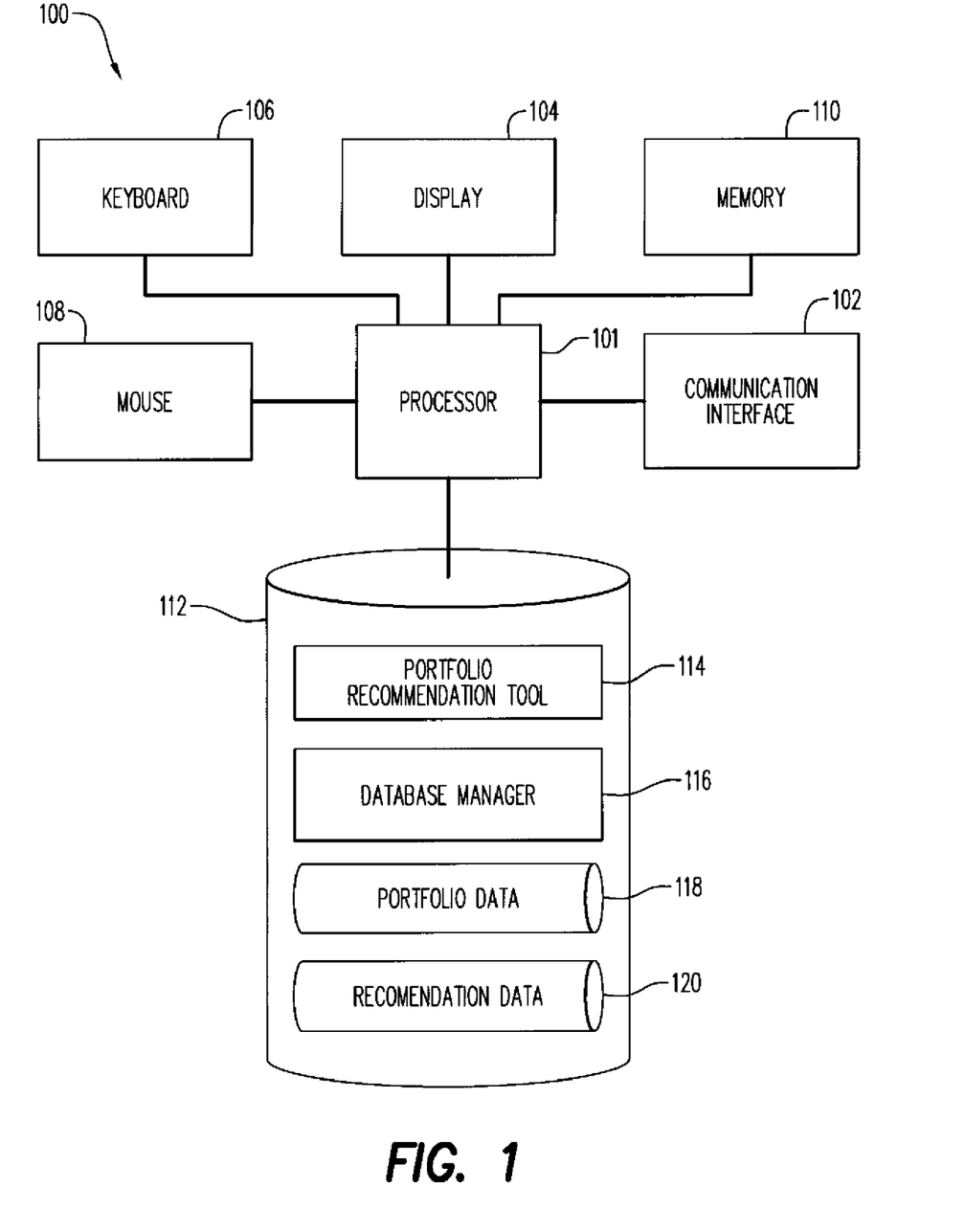
FIG. 1 is a block diagram of a computer system provided in accordance with some embodiments.

FIG. 1 is a block diagram of a computer system 100 which may be provided according to certain embodiments of the invention. In its hardware aspects the computer system may be entirely conventional, but the computer system may be programmed with software so that it performs functions in accordance with aspects of the invention.

The computer system 100 includes a processor 101, which may be a conventional microprocessor, or a number of processors operating in parallel. The processor 101 is in data communication with a communication interface 102, through which the computer system 100 is able to communicate with other devices, such as other computers. The processor 101 is also in data communication with a display screen 104, by which the computer system provides visual output to a user of the computer system. There may also be one or more printers (not shown) coupled to the processor 101 to allow the computer system to provide printed output. The computer system 100 may also include one or more input devices, such as a keyboard 106 and a computer mouse 108 or other pointing device. The keyboard 106 and the mouse 108 are in data communication with the processor 101.

The computer system also includes random access memory and/or other solid state memory devices, all represented by block 110 in FIG. 1, and all in communication with the processor 101. As is conventional, the memory 110 may provide temporary program storage and/or working memory capabilities.

Also included in the computer system 100 is a storage device 112, such as a conventional hard disk drive or group of hard drives, in data communication with the processor 101. The storage device 112 may store a number of programs, such as a portfolio recommendation tool program 114, which is described below, and which is provided in accordance with the invention to control the processor 101 so that the computer system 100 operates in accordance with one or more aspects of the present invention. The storage device 112 may also store a conventional database manager program 116.

Also stored in the storage device 112 are one or more databases and/or data structures, including for example a portfolio database 118. The portfolio database 118 may store numerical performance measures for items included in a portfolio. In one particular embodiment of the invention, the portfolio database may store financial information and other information with respect to a portfolio of real estate holdings. The portfolio recommendation tool 114, as will be seen, may be operable by a user of the computer system 100 to generate a recommended list of properties to be sold and/or retained. Block 120 in FIG. 1 represents a database containing data resulting from operation of the portfolio recommendation tool 114, including a hold or sell recommendation with respect to each property.

The storage device 112 may also store other programs (not indicated in the drawings) such as a conventional operating system, one or more device drivers, and a conventional spreadsheet program.

Further, the computer system 100 may include one or more drives (not indicated in the drawing) for reading data from and/or writing data to removable data storage media.

Figure 2:
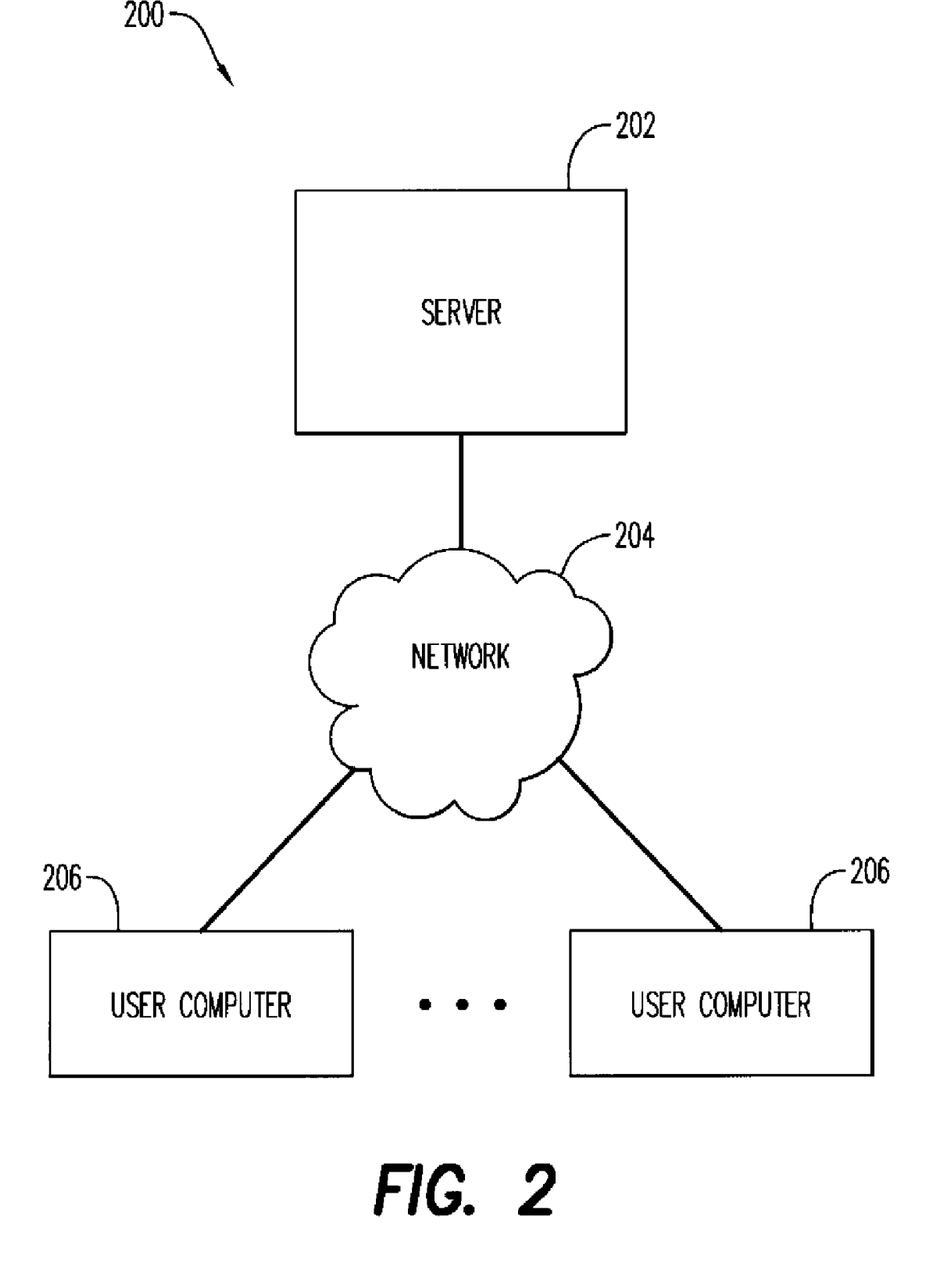
FIG. 2 is a block diagram of a networked computer system provided in accordance with some other embodiments.

FIG. 2 is a block diagram of a networked computer system 200, which is an alternative embodiment of the invention. The computer system 200 includes a server computer 202, connected (at least from time to time) via a data communication network 204 to one or more user computers 206. In terms of its hardware aspects, the computer system 200 may be entirely conventional.

The user computers 206 may include, among other conventional features, browser software, a display screen and a mouse or other pointing device (none of which is separately shown) to allow the user computers to interact as client devices with screen display pages downloaded from the server 202. The server may store a real estate portfolio database (not separately indicated), or other asset database and may be programmed to provide to the user computers the portfolio recommendation tool functionality that will be described below.

Figure 3:
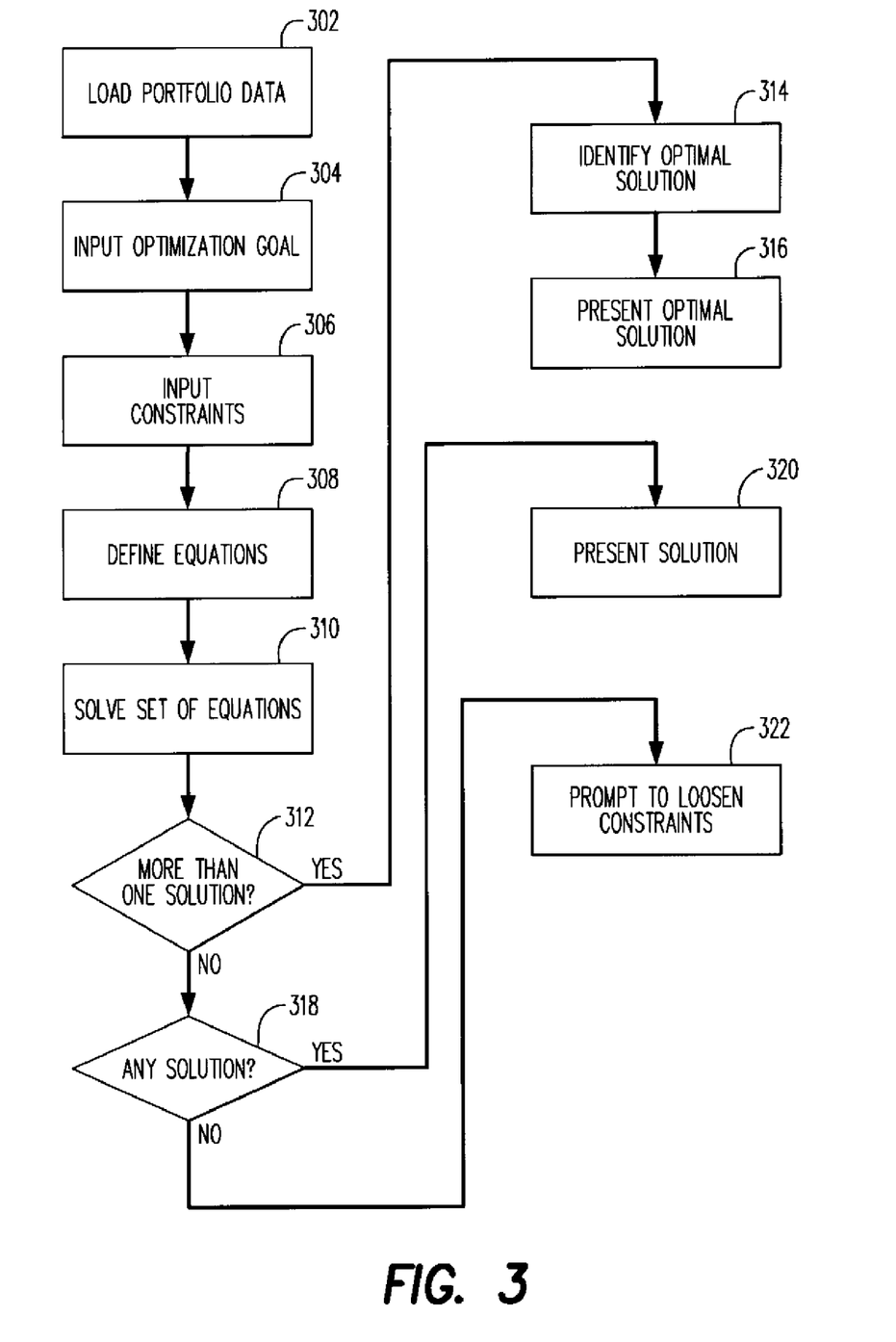
FIG. 3 is a flow chart that illustrates a process that may be performed, in accordance with aspects of the present invention, in the computer systems of FIGS. 1 and 2.

FIG. 3 is a flow chart that illustrates a process that may be performed, in accordance with aspects of the present invention, in the computer systems of FIGS. 1 and 2. In particular, the flow chart describes an example of operation of the portfolio recommendation tool referred to above (e.g., as shown in FIG. 1 as block 114). In this example, it is assumed that the portfolio recommendation tool is adapted to provide recommendations with respect to selling or retaining properties in a real estate portfolio.

At 302, data is loaded into the portfolio recommendation tool so that the portfolio recommendation tool can process the data, in accordance with inputs from the user, to produce a recommendation as to which properties are to be sold and which retained. The data may be loaded from or accessible in the portfolio database 118 (FIG. 1) or in a similar database maintained in the server computer 202 (FIG. 2). In some embodiments, the data may include financial and other data concerning real properties which make up a portfolio of real properties. The properties may include, for example, office buildings, shopping centers and other commercial properties and/or residential rental properties.

Figure 4:
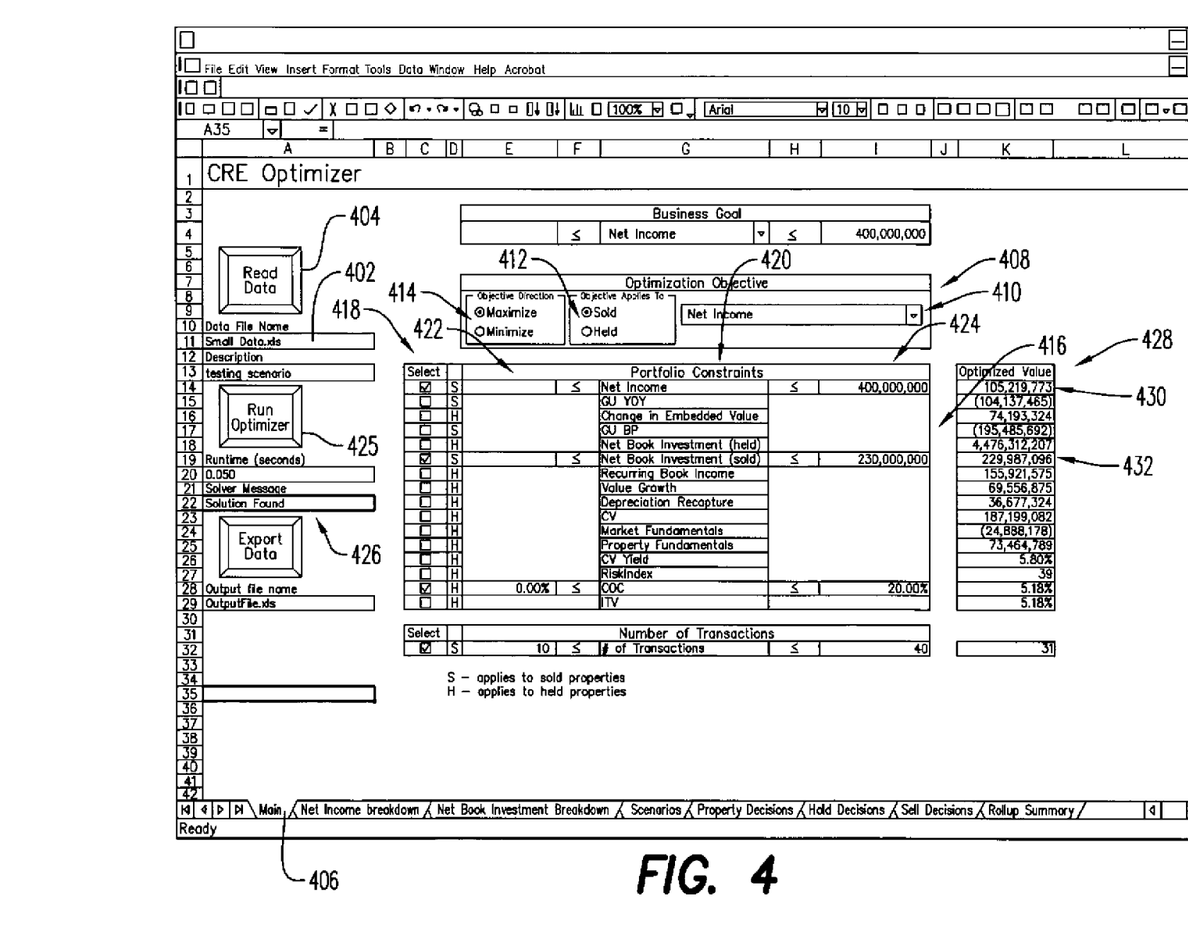
FIGS. 4-9 are screen displays that illustrate a graphical user interface (GUI) that may be provided in the computer systems of FIGS. 1 and 2 to allow a user to enter inputs and/or view results with respect to the process of FIG. 3.

The loading of the portfolio data may be performed in response to the user interacting with the screen display shown in FIG. 4. In particular, the user may specify the name of the pertinent data file in data entry field 402, and then may use the mouse to actuate virtual button 404 to initiate loading of the portfolio data. It will be noted that the screen display shown in FIG. 4 corresponds to a tab 406 that is labeled "Main". It should also be understood that the screen display shown in FIG. 4 and the other screen displays appended hereto may be displayed from time to time on the display unit 104 shown in FIG. 1.

Referring again to FIG. 3, at 304 the user is permitted to input a portfolio performance measure that is to be optimized (minimized or maximized, as the user specifies) by selecting properties in the portfolio for sale or retention. The user may enter this objective by interacting with a region of the FIG. 4 screen display indicated at 408. The screen display region 408 includes a pull-down menu 410 by which the user may select the performance measure to be optimized. Further, the screen display region 408 includes a pair of radio buttons 412 by which the user may select whether the performance measure is to be optimized with respect to properties to be sold or with respect to properties to be retained. Also, the screen display region 408 includes a pair of radio buttons 414 by which the user may select whether the optimization of the performance measure is to consist of maximizing the performance measure or minimizing the performance measure. In the particular example shown in FIG. 4, the optimization objective is selected to be maximizing the net income to be produced from selling properties in the portfolio.

Referring once more to FIG. 3, at 306 the user is permitted to provide input that sets constraints upon the recommendations that the system is to provide in regard to attempting to achieve the objective entered at 304. The constraints may be expressed in terms of portfolio performance measures. In the particular example shown, the portfolio performance measures may include one or more of the following: (A) Net income, (B) Economic give up—year over year ("EGU YOY"—with EGU defined as the change in market value and recurring income; recurring income in turn defined as the net operating income less cost of funds), (C) Change in embedded value (with embedded value taking into account changes in the accounting basis for the properties in question), (D) Economic give up according to business plan ("EGU BP"), (E) Net book investment, (F) Recurring book income, (G) Value growth (defined as increase in market value), (H) Depreciation recapture, (I) Contribution value ("CV"—defined as net operating income less cost of funds), (J) Market fundamentals, (K) Property fundamentals, (L) Yield based on contribution value ("CVY"), (M) Risk index, (N) Cash on cash ("COC"—defined as net operating income divided by net book investment), and (O) Investment to value ("ITV"—defined as net book investment divided by market value).

In order to enter the performance measure constraints, the user may interact with a region 416 in the FIG. 4 screen display. The region 416 includes a column of checkboxes 418. By selecting (checking) a particular one of the checkboxes, the user selects a performance measure (indicated at central column 420 in region 416) for definition of a constraint. When the user checks a checkbox in a particular row, that action results in opening up of a data entry field in that row in the left-hand column 422 in region 416 to allow the user to enter numerical data that defines a lower bound for the performance measure indicated in the central column 420 for that row. Checking the checkbox in a row also opens up a data entry field in that row in the right-hand column 424 in region 416 to allow the user to enter numerical data that defines an upper bound for the performance measure indicated in the central column 420 for that row.

In the particular example illustrated in FIG. 4, the user has entered four performance measure constraints, namely:

(1) Net income not to exceed $400,000,000.

(2) Net book income of properties sold not to exceed $230,000,000.

(3) Cash on cash not less than 0.00% and not to exceed 20.00%.

(4) Number of transactions (number of properties to be sold) not less than 10 and not to exceed 40.

Figure 5:
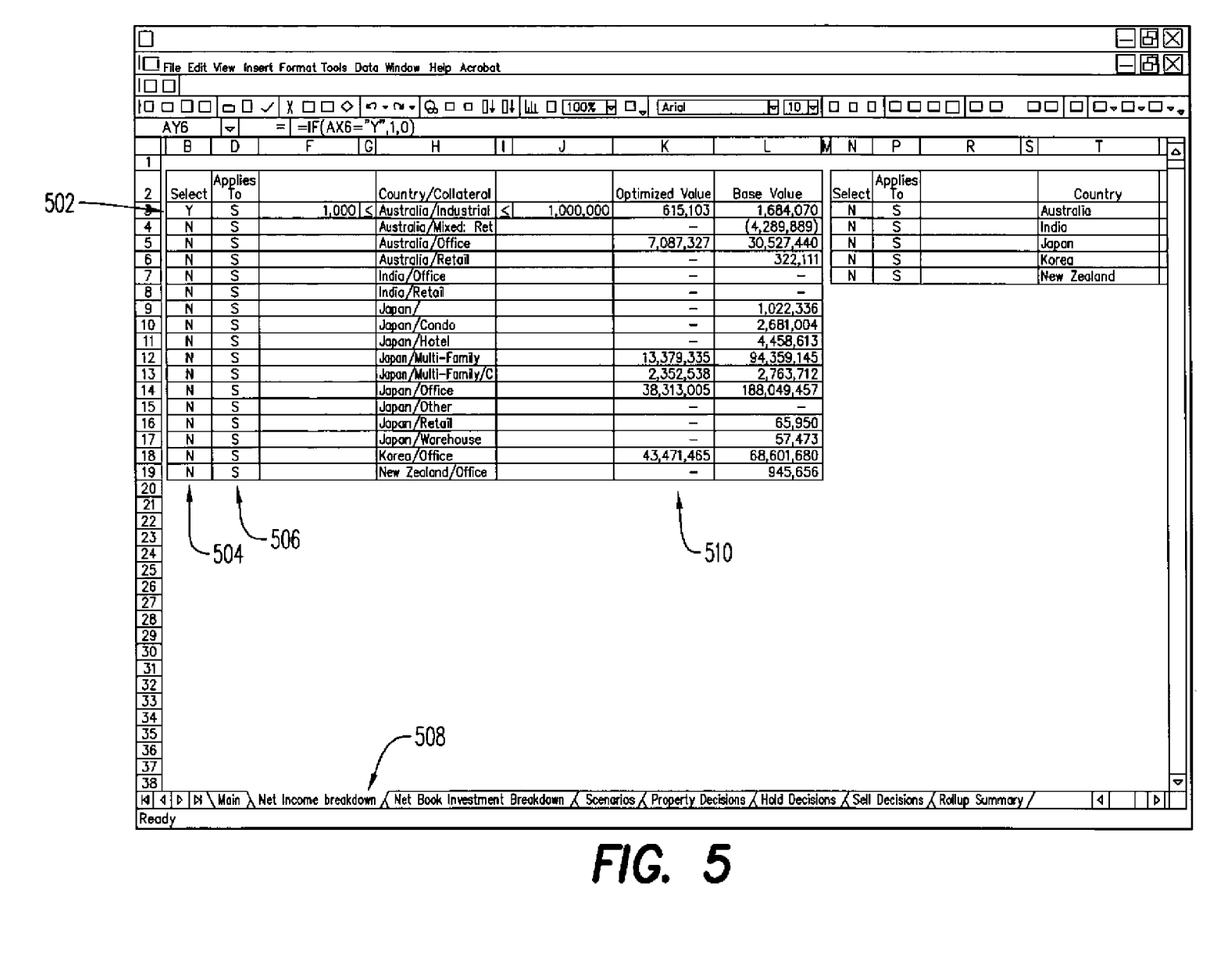

The constraints entered using the region 416 in FIG. 4 apply to totals for the entire portfolio. In addition or alternatively, the user may be permitted to enter constraints that apply only to portions of the portfolio. These portions of the portfolio may be referred to as "breakdowns". For example, FIG. 5 is a screen display that presents an interface by which the user may enter constraints applicable to subsets of the portfolio broken down geographically and/or by type of property. In the particular example shown in FIG. 5, the user has entered (at 502) a constraint that the aggregate net income realized from industrial properties located in Australia and recommended for sale must be not less than $1,000 and may not exceed $1,000,000. Selecting "Y" (i.e., "yes") in a row entry in the first column 504 allows a constraint to be specified for the corresponding category of properties. The second column 506 is used to specify whether the constraint that applies to properties recommended to be sold ("S") or to be held. Note tab 508 in FIG. 5, which indicates that the FIG. 5 screen display is for entering "net income breakdown" constraints.

Figure 6:
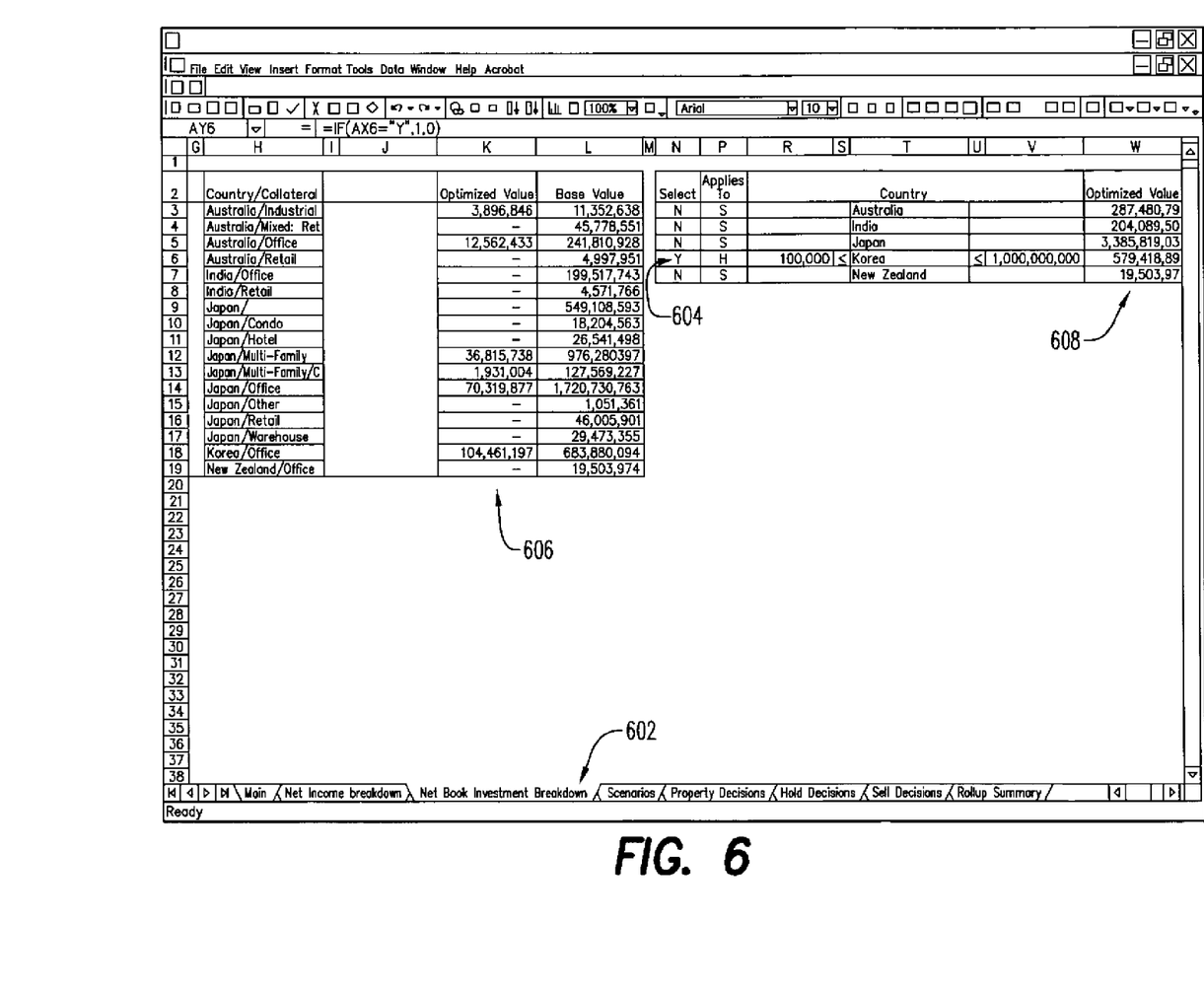

The FIG. 6 screen display provides similar functionality as in FIG. 5, except that FIG. 6 allows the user to specify "net book investment breakdown" constraints, as indicated by tab 602. In the particular example illustrated in FIG. 6, the constraint entered by the user (at 604) calls for the net book investment for the aggregate of properties located in Korea and recommended for sale to be not less than $100,000 and not to exceed $1,000,000,000.

At 308 in FIG. 3, the computer translates the constraints entered by the user into a set of equations. For the sake of the following discussion, it will be assumed that the variables $x_p$ described below will be assigned the value "1" if the property is recommended to be sold and will be assigned the value "0" if the property is recommended to be retained.

For each constraint that applies to an aggregate of properties to be sold, the equation defined for a given constraint is in the form $$M^L \leq \sum_p M_p x_p \leq M^U \qquad \text{(Eq. 1)}$$

where:

M represents the performance measure to which the constraint applies (e.g., performance measures indicated in region 416 in FIG. 4), with $M^L$ representing the lower bound for the performance measure M according to the constraint;

$M^U$ representing the upper bound for the performance measure M according to the constraint;

$M_p$ being the value of the performance measure M with respect to the p'th property; and $x_p$ representing the variable which indicates whether the p'th property is recommended to be sold or retained.

If the constraint applies to the portfolio as a whole, then the summation in Equation (1) is taken over all the properties in the portfolio. If the constraint applies only to a "breakdown", then the summation in Equation (1) is taken over the properties in the relevant breakdown group.

For each constraint that applies to an aggregate of properties to be retained, the equation defined for the constraint is in the form $$M^L \leq \sum_p (M_p(1 - x_p)) \leq M^U \qquad \text{(Eq. 2)}$$

Equations (1) and (2) apply in the case of performance measures A-K listed above. In the case of performance measures L-O, the constraint uses a weighted average on Net Book Investment (NBI). The constraint (if any) for these measures is modeled with Equation (3) below for Held properties and with Equation (4) below for Sold properties.

$$M^L \le \frac{\sum_p M_p NBI_p(1-x_p)}{\sum_p NBI_p(1-x_p)} \le M^U \quad \text{(Eq. 3)}$$

$$M^L \le \frac{\sum_p M_p NBI_p x_p}{\sum_p NBI_p x_p} \le M^U \quad \text{(Eq. 4)}$$

The user may further constrain the process of generating recommendations by prescribing that certain properties are to be sold and/or that certain properties are to be retained, regardless of other considerations. For these properties, the constraints in question force the value of $x_p$ to be "0" for properties constrained to be retained, and force the value of $x_p$ to be "1" for properties constrained to be sold.

In some constraints, properties may be assigned to a group of properties, with all properties in the group to be sold, or with all properties in the group to be held. To implement this type of constraint, the database 118 may include a "Group ID" field. If two or more properties have the same value in the "Group ID" field, then that set of properties must all be treated in the same way, i.e., either all sold or all held. A constraint of this type may be implemented as follows:

Let k=1, 2, . . . , K be the distinct property groups.

Let $G_k$ be the set of property indices that belong to the property group k. That is, all these properties have the same group id field value.

Let $y_k=1$ if property group sold, 0 otherwise.

$$\sum_{p \in G_k} x_p = \text{Size}(G_k) y_k,$$

for all k.

As suggested by previous discussion, the set of constraint equations may also include a limit (upper and/or lower bound) on the number of properties to be sold. Such a constraint may be implemented with Equation (5) below.

$$T^L \le \sum_k y_k \le Y^U, \quad \text{(Eq. 5)}$$

where $T^L$ is the lower bound on the number of properties sold and $T^U$ is the upper bound on the number of properties sold.

At 310 in FIG. 3, the computer system 100 solves, if possible, the set of equations that it generated to model the constraints entered by the user. The user may signal to the computer system that all desired constraints have been entered, and trigger the solution of the set of equations, by actuating the button shown at 425 in FIG. 4. In some embodiments the solving of the equations may be implemented with a conventional equation solving utility such as "bintprog" (part of the MATLAB 7 optimization toolbox), "lp_solve" or "Tomlab/Cplex". Depending on the number and nature of the constraints, there may not be any feasible solution. Where the number of variables is high, and the constraints are not very restrictive, there may be a considerable number of feasible solutions.

Continuing to refer to FIG. 3, a decision block 312 follows block 310. At decision block 312, the computer system 100 determines whether the solving of the set of equations at 310 produced more than one solution. If so, then block 314 follows decision block 312. At block 314, and based on the optimization goal input at 304, the computer system identifies the solution which optimizes the performance measure which was the subject of the optimization goal. That is, the computer system identifies the solution which maximizes or minimizes, as called for by the optimization goal, the performance measure which was the subject of the optimization goal. The solution which the computer system identifies as optimal is then presented to the user, as indicated by block 316.

Figure 7:
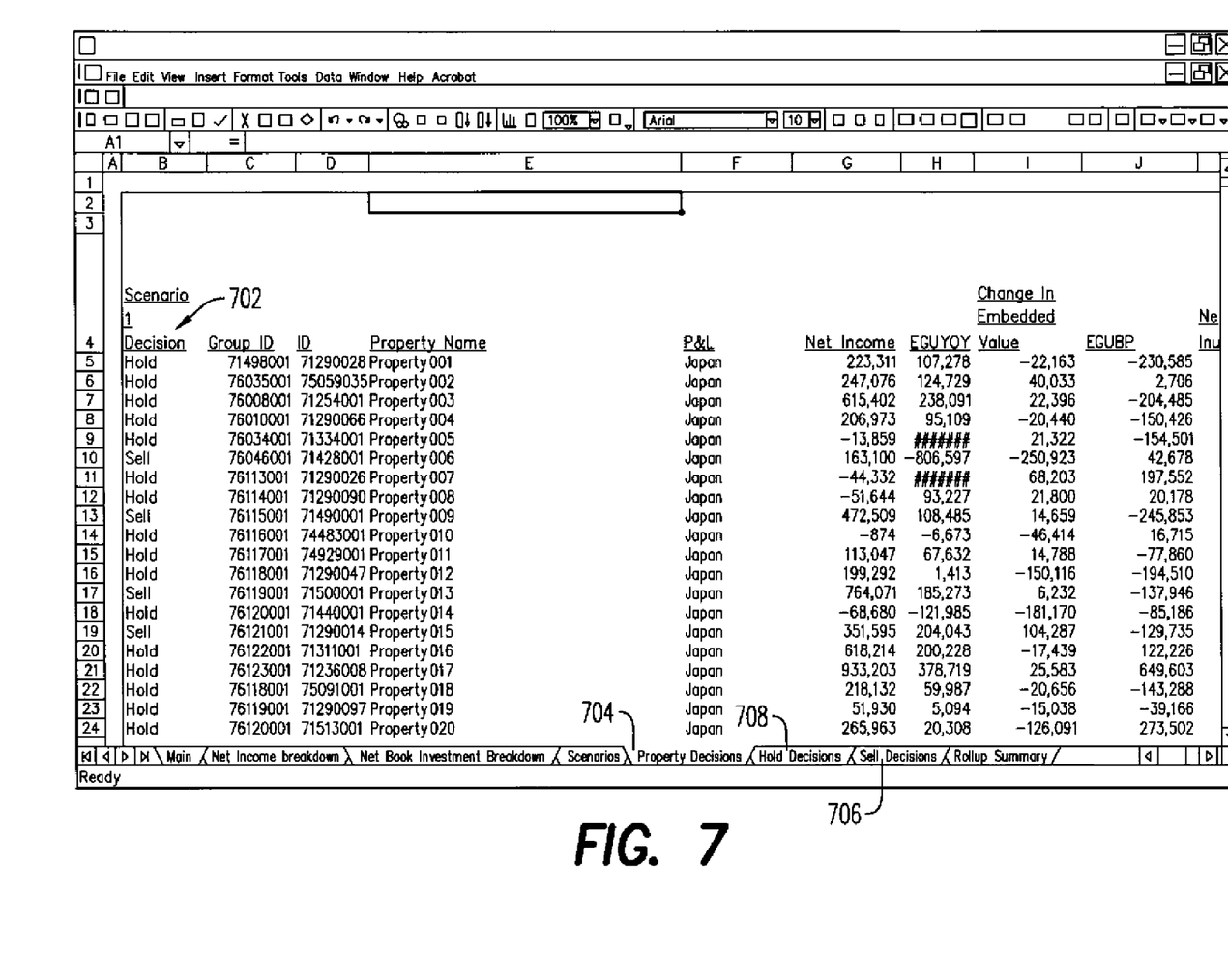

The solution may be presented to the user in a number of different aspects. For example, the indication at 426 in FIG. 4 informs the user that the equation solving/optimization process has been successfully completed. The screen display provided in FIG. 7 lists all of the properties in the portfolio with an indication (in left-hand column 702) with respect to each property to indicate whether the optimal solution recommends selling or retaining the property. Other columns in FIG. 7 set forth some or all of the performance measures for the property. Note tab 704 in FIG. 7 which allows the user to access the portfolio-wide presentation of the optimal solution. Tabs 706 and 708 may be actuated by the user to access a presentation, respectively, of all properties recommended for sale and all properties recommended to be retained.

Figure 8:
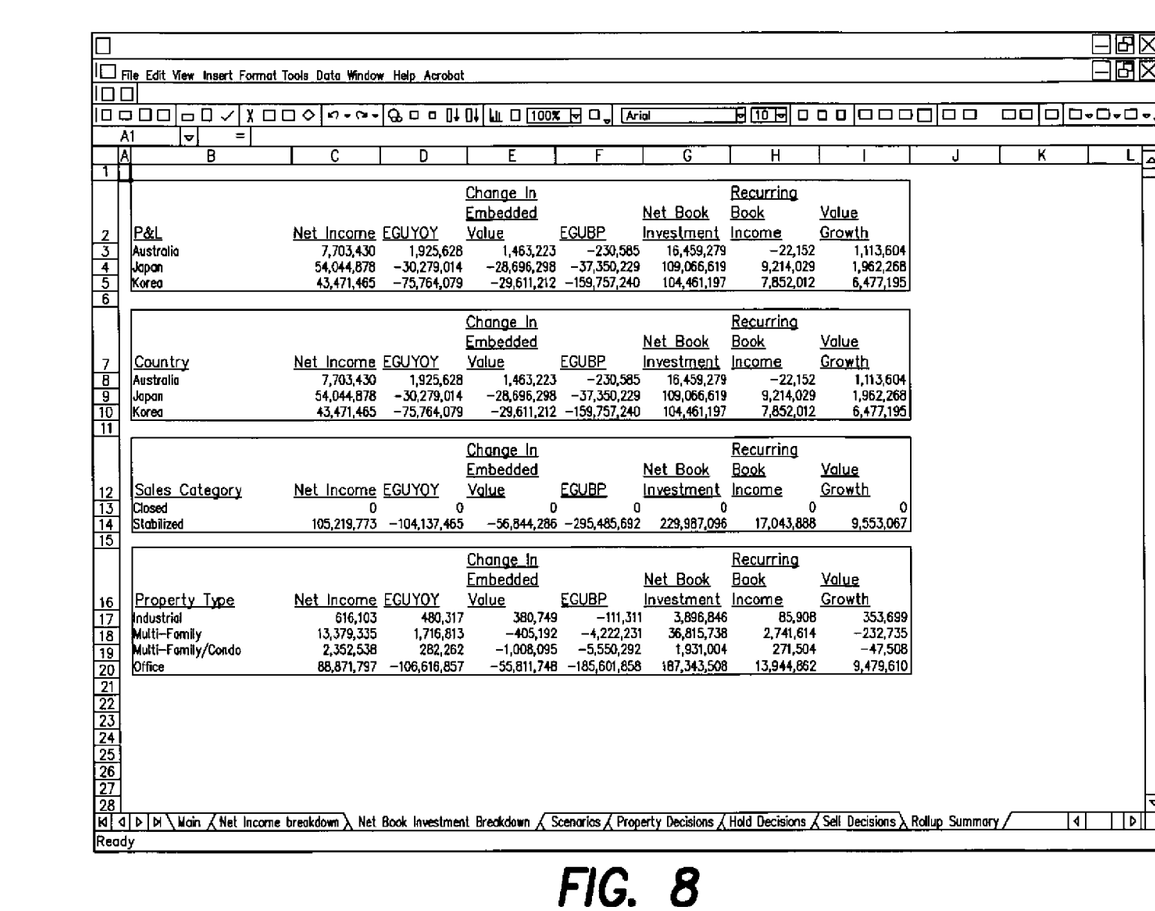

Aggregated performance measures for the optimal solution are presented at column 428 in FIG. 4. The entry at 430 in column 428 indicates that, in this particular example, the optimal solution produced an aggregate of about $105,000,000 of net income, which was the performance measure to be maximized according to the optimization goal. The entry at 432 in column 428 indicates that in this example the key constraint was the upper bound of $230,000,000 on aggregate book investment of the properties recommended for sale. Aggregated performance measures produced by the optimal solution for various "breakdown" groups of properties are presented, e.g., at column 510 in FIG. 5 and at columns 606 and 608 in FIG. 6. Still another presentation of certain aggregated performance measures produced by the optimal solution may be accessed by the user in the "rollup summary" display shown in FIG. 8.

According to one way in which the invention may be operated, the user may enter plural sets of constraints to investigate how changing one or more of the constraints may affect the optimal solution and the extent to which the optimization goal is met. Each set of constraints may be referred to as a scenario. One possible scenario is represented by the constraints entered as indicated in FIGS. 4-6. If the user were not satisfied with the result of that scenario—for example, if the user wished to produce a higher aggregate net income from sale of properties—the user could, for example, loosen the "net book investment (sold)" constraint by increasing the upper bound on that constraint above the figure of $230,000,000. For example, the user could increase the net book investment (sold) upper bound to $250,000,000 and then could trigger another cycle of solving the resulting set of equations for this new scenario. The user could then note whether the optimal solution presented by the computer system for the new scenario results in an increased aggregate net income from sale of properties. The user could enter additional new scenarios, while adjusting the net book investment (sold) upper bound up or down to explore potential trade-offs between net income and net book investment (sold). Moreover, more than one constraint could be modified and/or one or more additional constraints may be added and/or one or more constraints may be removed in defining new scenarios.

Figure 9:
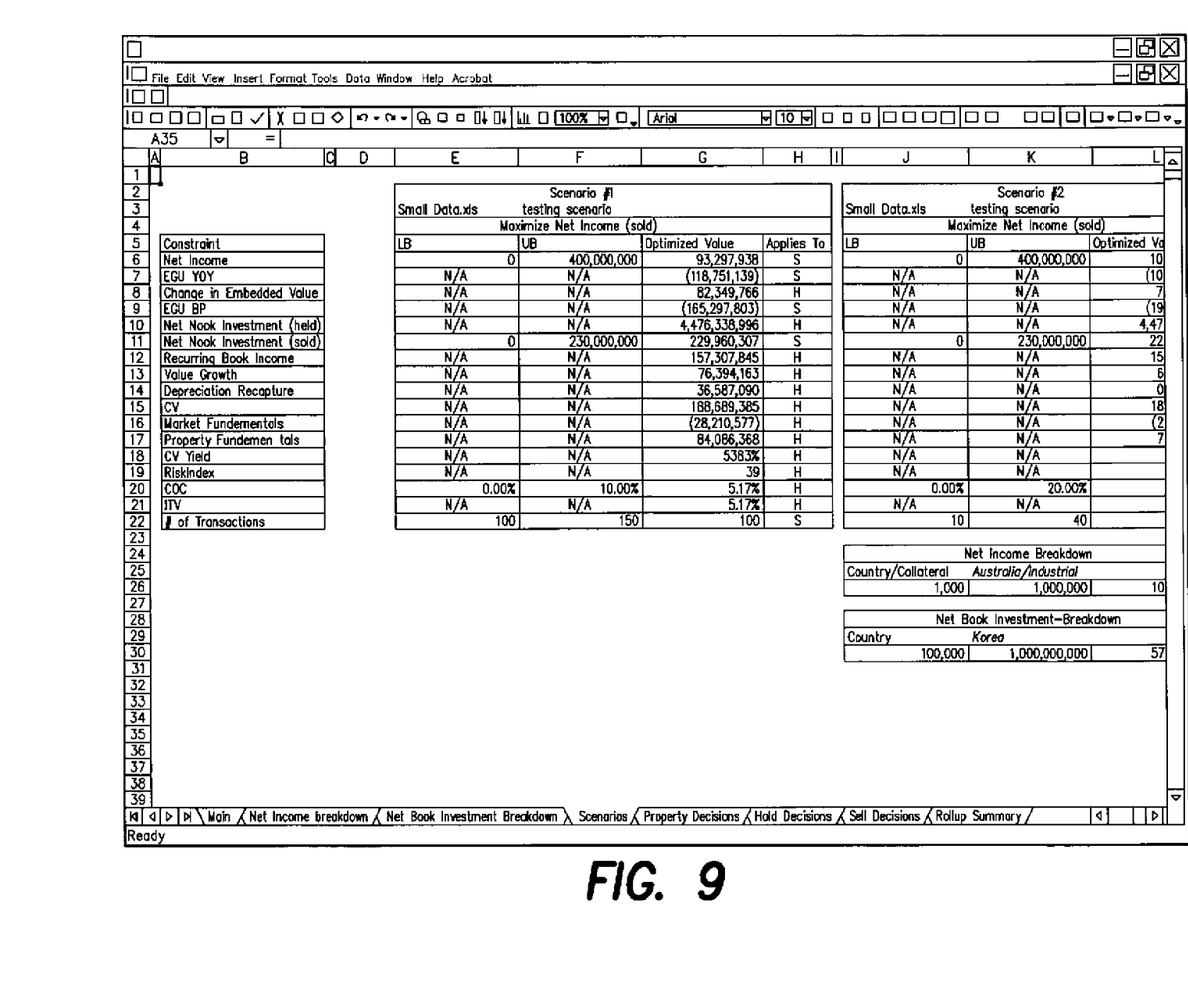

In some embodiments, the computer system may store the various scenarios and the aggregated results of the scenarios for subsequent reference and comparison by the user. FIG. 9 is an example screen display in which the computer system presents plural scenarios (previously defined by the user) to the user for review and/or comparison.

The user is permitted to actuate a button 434 (FIG. 4) to save the sell/retain recommendations and/or other aspects of the current scenario in a file that is external to the portfolio recommendation tool.

Referring again to FIG. 3, if at decision block 312 it is determined that more than one solution was not produced by solving the set of equations, then decision block 318 follows decision block 312. At decision block 318, it is determined whether there was any feasible solution for the set of equations. If so, that one solution is presented to the user, as indicated 320. However, if at decision block 318 it is determined that there is no feasible solution to the set of equations, then this fact is reported to the user, and the computer system (at block 322) implicitly or explicitly prompts the user to loosen and/or eliminate one or more constraints and to try again.

In general, if the number of constraints included in a scenario is large and/or the constraints are relatively tight, there is a greater chance that the scenario will fail to produce a solution. Accordingly, it may be desirable in operating the portfolio recommendation tool to start with a scenario that has relatively few and relatively loose constraints, so that at least one solution is produced. Thereafter, the user may elect to gradually and/or sequentially add and/or tighten constraints to attempt to achieve some potentially conflicting goals while at least partially achieving the optimization goal input at 304 in FIG. 3.

In the examples depicted up to this point, the portfolio recommendation tool is adapted to recommend a set of hold/sell decisions with respect to a portfolio of real properties. However, in other embodiments, the portfolio recommendation tool may be modified to support other types of portfolio-related decision making in regard to other types of portfolios.

As one alternative example, the user may have available a "virtual" portfolio of real properties that the user (or the users employer) does not currently hold but that are available for purchase by the user or his/her employer. The binary variable values in this case may correspond to recommendations to acquire or not to acquire individual properties available for purchase.

As another type of example, the portfolio of holdings, instead of being commercial real estate, may rather consist of energy-related assets such as energy generation facilities and/or energy transportation facilities. "Energy generation facilities" include power generation plants; "energy transportation facilities" include oil or gas pipelines, and/or electricity transmission lines. The binary variable values again may correspond to recommendations to sell or retain. Alternatively, a virtual portfolio of energy-related assets available for acquisition may be the subject of the desired recommendation, and the binary variable values may correspond to acquire/don't acquire recommendations. The performance measures defined for such assets may include capacity to produce and/or transport certain amounts of energy or energy-related commodities.

In still other embodiments, the portfolio may consist of a number of transportable assets such as items of heavy equipment, military equipment, or military or other operational units of personnel and/or equipment. The recommendation that is desired may concern a decision to deploy or not to deploy the assets to a theater of operations or to a location of emergency remedial activity, etc. The performance measures defined for the assets may (among others) relate to operational capabilities of the assets and/or to the number of personnel in a unit and/or to the quantity of transportation capacity required to accomplish deployment of the assets.

In other embodiments, the portfolio may consist of medical facilities such as hospitals, clinics and medical offices. The recommendation that is desired may concern a decision to divest or not to divest at least some of the medical facilities in the portfolio. "To divest" means one or more of closing, selling or spinning off a facility to other ownership. The performance measures defined for the medical facilities may relate to, e.g., square footage, number of beds, employee head count, annual operating budget, and/or operating deficit or surplus.

In other embodiments, the portfolio may consist of programs in a television network's prime-time schedule. The recommendation that is desired may concern a decision as to whether to cancel the programs. The performance measures defined for the programs may relate to ratings/audience share in general and/or in certain audience categories. Other performance measures may relate to cost per episode.

In other embodiments, the portfolio may consist of athletes who are under contract/recruiting commitment letter and/or who are available for drafting/acquisition/recruitment. One portfolio to which this embodiment may be applicable is to athletes currently under contract by a professional sports franchise. Another ("virtual") portfolio may be all athletes currently under contract by other teams in a professional sports league. Another portfolio may be some or all student athletes available for a current year's professional draft in a given sport. Another portfolio may be some or all high school athletes in a given sport who are currently eligible for college recruitment. Another portfolio may be all athletes available for selection for a fantasy sports "team". The recommendation that is desired may concern whether to recruit, draft, trade for, trade away, sign to an agreement or include an athlete in a fantasy sports team. The performance measures may include some or all of the myriad statistics used to evaluate and/or record individual athletic performance in a given team sport. Other performance measures may relate to a position or positions played by athletes. Other performance measures may relate to bio-statistics such as age, height, weight, running speed, etc. Other performance measures may relate to a measure of the relative merit of a school's or college's athletic program in a particular sport. Other performance measures may relate to the contract compensation of a professional athlete. Other performance measures may relate to the date of expiration of a professional athlete's contract.

Other types of portfolio-related decision making, and/or relating to other types of portfolios, may be supported in other embodiments. The performance measures included in the portfolio-related data may of course vary depending on the nature of the items in the portfolio.

The optimization goal may, but need not, be entered by interacting with the same screen display or set of screen displays used to enter performance measure constraints. FIG. 4 is an example of a screen display used to enter both the optimization goal and at least some performance measure constraints.

A "computer usable medium" refers to any physical object on which program instructions may be stored in machine-readable form, and thus includes solid state memory devices such as RAM, ROM or flash memory and also includes disk-shaped storage devices such as hard disk drives, CD-ROMs, floppy disks, etc.

It will be appreciated that the details of the screen displays appended hereto may be modified in a number of ways while still providing substantially the same functionality to the user. For example, there may be more or fewer than the two "breakdown constraint" input screens shown in FIGS. 5 and 6. The number of constraints that may be entered in one screen may be more or fewer than the number depicted in FIG. 4. Portfolio-wide constraints may be entered in two or more screens and/or in two or more tables within one screen.

FIG. 3, and the above description of the process illustrated by that drawing, should not be considered to imply a fixed order of performing the steps of the process. Rather, the steps may be performed in any order that is practicable. Many of the steps shown in FIG. 3 as sequential to other steps may be performed in another sequence, such as prior to, interspersed with, or immediately triggered by, steps shown as prior in the sequence.

The present invention has the technical effect of facilitating and improving the operation of data processing equipment in managing real estate portfolios or other collections of assets.

As used herein and in the appended claims, "database" may refer to one or more related or unrelated databases. Data may be "stored" in raw, excerpted, summarized and/or analyzed form.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of managing a portfolio of real estate, the method comprising:
   storing, in a computer system, a database containing performance measure data regarding performance measures of a plurality of real estate properties;
   inputting into the computer system a plurality of performance measure constraints;
   generating, by the computer system processor executing instructions stored on a storage device, a set of equations based on said plurality of performance measure constraints, said equations including a plurality of variables, each of said variables corresponding to a respective one of said real estate properties, each of said variables to be assigned a value from a group of values, said group of values including at least two values, one of said two values indicative of a recommendation to take an action with respect to a one of said real estate properties that corresponds to a respective one of said variables, another of said two values indicative of a recommendation to take another action with respect to said one of said real estate properties; and
   solving, by the computer system, the set of equations that generate one or more of a plurality of solutions that satisfy said performance measure constraints;
   inputting into the computer system an optimization goal;
   evaluating, by the computer system, said plurality of solutions that identify at least one of said solutions, said one of said solutions being optimal relative to said optimization goal; and
   presenting, by the computer system, said identified solution as a recommended decision relative to taking said actions with respect to said real estate properties;
   wherein:
   each equation of said set of equations is in a form as indicated below:

$$M^L \leq \sum_{p=1}^{P} M_p * x_p \leq M^U$$

where:
M represents a performance measure to which a respective one of the performance measure constraints applies, with
$M^L$ representing a lower bound for the performance measure M according to the respective constraint;
$M^U$ representing an upper bound for the performance measure M according to the constraint;
$M_p$ being a value of the performance measure M with respect to a p'th real estate property; and
$x_p$ representing a variable which indicates whether the p'th real estate property is recommended to be sold or retained;
wherein $x_p$ is constrained to be one of two values, said two values being "0" and "1".

2. The method of claim 1, wherein said actions are selling, holding, acquiring, or not acquiring, said real estate properties.

3. An apparatus comprising:
   a processor; and a storage device in communication with the processor and storing program instructions, that when executed by the processor:
   store a database containing performance measure data regarding performance measures of a plurality of real estate properties;
   allow a user to input a plurality of performance measure constraints;
   generate a set of equations that model the performance measure constraints, said equations including a plurality of variables, each of said variables corresponding to a respective one of said real estate properties, each of said variables to be assigned a value from a group of values, said group of values including at least two values, one of said two values indicative of a recommendation to take an action with respect to a one of said real estate properties that corresponds to a respective one of said variables, another of said two values indicative of a recommendation to take another action with respect to said one of said real estate properties;
   solve the set of equations and generate one or more of a plurality of solutions that satisfy said performance measure constraints;
   allow the user to input an optimization goal;
   evaluate said plurality of solutions that identify a one of said solutions, said one of said solutions being optimal relative to said optimization goal; and
   present said identified solution as a recommended decision relative to taking said actions with respect to said items;
   wherein each equation of said set of equations is in a form as indicated below:

$$M^L \leq \sum_{p=1}^{P} M_p * x_p \leq M^U$$

where:

M represents a performance measure to which a respective one of the performance measure constraints applies, with $M^L$ representing a lower bound for the performance measure M according to the respective constraint;

$M^U$ representing an upper bound for the performance measure M according to the constraint;

$M_p$ being a value of the performance measure M with respect to a p'th real estate property; and $x_p$ representing a variable which indicates whether the p'th real estate property is recommended to be sold or retained;

wherein $x_p$ is constrained to be one of two values, said two values being "0" and "1".

4. The apparatus of claim 3, wherein said actions are selling, holding, acquiring, or not acquiring, said real estate properties.

5. An article of manufacture comprising:

a computer usable medium having computer readable program code means embodied therein that process data stored in a database, the database containing performance measure data regarding performance measures of a plurality of real estate properties, the computer readable program code means in said article of manufacture comprising:

computer readable program code means for allowing a user to input a plurality of performance measure constraints;

computer readable program code means for generating a set of equations that model the performance measure constraints, said equations including a plurality of variables, each of said variables corresponding to a respective one of said real estate properties, each of said variables to be assigned a value from a group of values, said group of values including at least two values, one of said two values indicative of a recommendation to take an action with respect to a one of said real estate properties that corresponds to a respective one of said variables, another of said two values indicative of a recommendation to take another action with respect to said one of said real estate properties; and computer readable program code means for solving the set of equations that generate one or more of a plurality of solutions that satisfy said performance measure constraints;

computer readable program code means for allowing the user to input an optimization computer readable program code means for evaluating said plurality of solutions that identify a one of said solutions, said one of said solutions being optimal relative to said optimization goal; and computer readable program code means for presenting said identified solution as a recommended decision relative to taking said actions with respect to said real estate properties;

wherein each equation of said set of equations is in a form as indicated below:

$$M^L \leq \sum_{p=1}^{P} M_p * x_p \leq M^U$$

where:

M represents a performance measure to which a respective one of the performance measure constraints applies, with $M^L$ representing a lower bound for the performance measure M according to the respective constraint;

$M^U$ representing an upper bound for the performance measure M according to the constraint;

$M_p$ being a value of the performance measure M with respect to a p'th real estate property; and $x_p$ representing a variable which indicates whether the p'th real estate property is recommended to be sold or retained;

wherein $x_p$ is constrained to be one of two values, said two values being "0" and "1".

6. The article of manufacture of claim 5, wherein said actions are selling, holding, acquiring, or not acquiring, said real estate properties.

* * * * *